Aug. 11, 1925.
T. F. BOWLER
WHEEL RIM
Filed Sept. 20, 1924
1,549,058
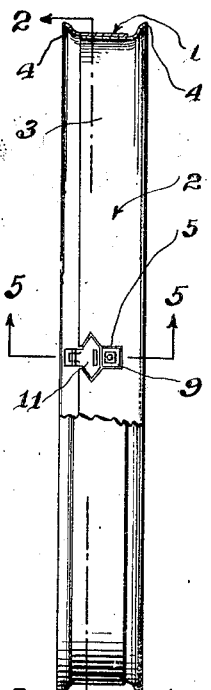
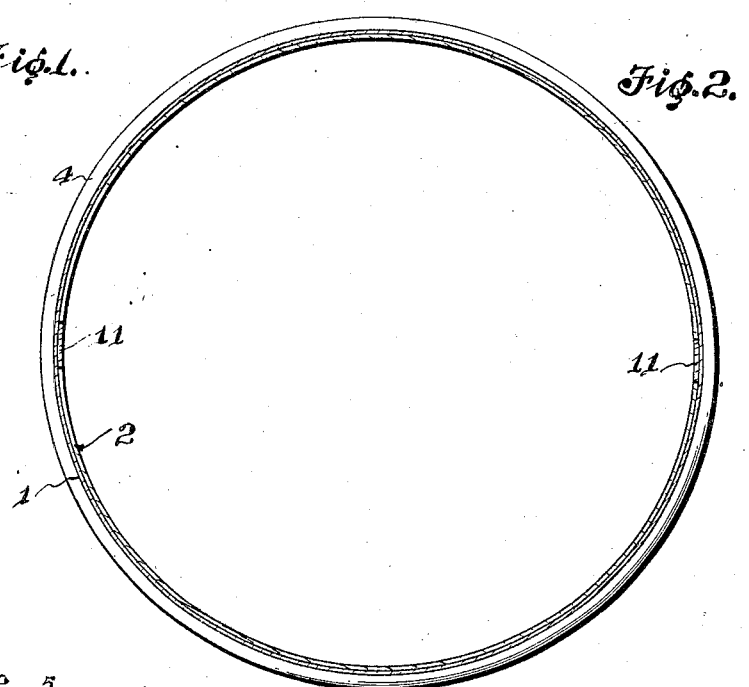
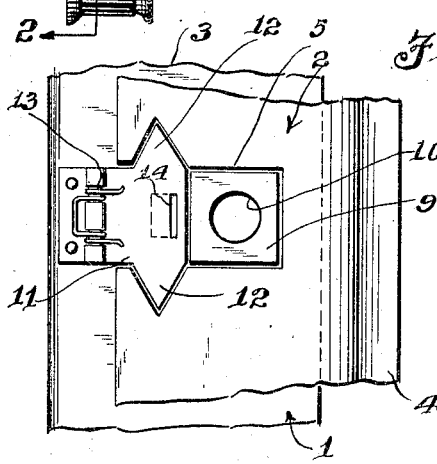
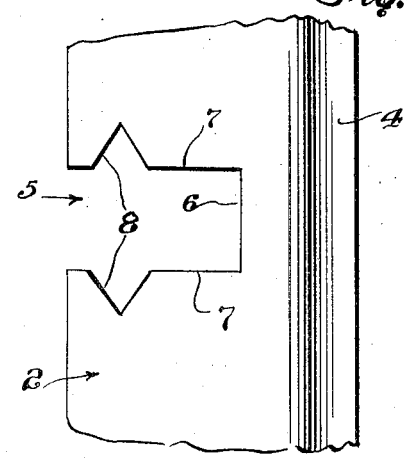
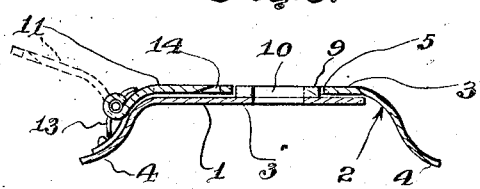
Inventor
T. F. Bowler
By R. J. Bassett
Attorney Patented Aug. 11, 1925.

1,549,058

UNITED STATES PATENT OFFICE.

THOMAS F. BOWLER, OF BOISE, IDAHO.

WHEEL RIM.

Application filed September 20, 1924. Serial No. 738,916.

*To all whom it may concern:*

Be it known that I, THOMAS F. BOWLER, a citizen of the United States, residing at Boise, Ada County, Idaho, have invented certain new and useful Improvements in Wheel Rims, of which the following is a specification.

This invention relates to improvements in automobile wheels and especially to tire rims.

The ordinary one piece pneumatic tire rim, now in general use, securely holds a tire in position, but it is very difficult to place a pneumatic tire on or to remove such a tire from these one piece rims.

It is the primary object of the present invention to provide a sectional rim, one section of which may be detached from the other for the purpose of placing the tire on or removing the same from the rim.

Another object of the invention is to furnish a rim consisting of two telescoping ring-like sections, and improved means for locking these sections together against displacement in any direction.

With the foregoing objects outlined and with other objects in view which will appear as the description proceeds, the invention consists in the novel features hereinafter described in detail, illustrated in the accompanying drawing and more particularly pointed out in the appended claims.

Referring to the drawing,

Fig. 1 is an edge view partly in section, of the improved rim.

Fig. 2 is a sectional view of the same taken on line 2—2, Fig. 1.

Fig. 3 is a plan view of a detail.

Fig. 4 is a similar view of another detail.

Fig. 5 is a sectional view taken on line 5—5 of Fig. 1.

In the drawing, 1 designates the outer section and 2 the inner section of the rim. Each of these sections consists of a cylindrical portion 3 provided at its edge with an outwardly extending annular flange 4. These flanges engage the tire beads in the usual manner. The cylindrical portions of the rim sections telescope as shown in the drawing, and for locking the parts in this relation, the following provision is made. The inner section 2 is provided with two or more notches 5. In the present embodiment, two such notches are arranged at diametrically opposite sides of the rim, and each notch has a circumferentially extending wall 6, parallel transverse edges 7, and oppositely disposed V-shaped recesses 8.

The outer section 1 is provided with diametrically opposite inwardly extending rectangular lugs 9, one of which has an aperture 10 to permit the passage of the valve stem of the tire. As best shown in Figs. 1 and 3, the lugs 9 are adapted to enter the notches 5, when the sections 1 and 2 are moved into telescopic relation. When the parts have been moved into this position, hinge leaves 11 are moved into the notches, and each leaf has opposite points 12 which enter the recesses 8 and prevent the section 2 from being moved away from the section 1. Each hinge is provided with a spring 13 tending to maintain the leaf 11 in the locked position shown in Figs. 1 and 3. From Fig. 5, it may be seen that when the hinges are in locking position, the inner surfaces of the leaves 11 are flush with the inner surface of the cylindrical portion 3 of the inner section 2, and consequently they will not interfere when the rim is placed on the wheel felly.

Assuming that the sections 1 and 2 are in assembled relation and it is desired to place a tire on the rim, a screw driver or the like is inserted in the slot 14 of each leaf 11 and the leaves are pried up, as shown in dotted lines in Fig. 5. Then the sections 1 and 2 may be pulled apart. Now a tire casing with a tube in place is slipped over the periphery of the section 1 and at the same time the valve stem of the tube is inserted through the hole 10. Then the section 2 may be placed against the section 1 and the notches 5 brought into register with the lugs 9. Now the sections are pushed together, and finally the leaves 11 of the hinges are folded from their dotted line position in Fig. 5 to the full line position in the same figure. It is obvious that the tire may be removed by reversing this operation.

While I have disclosed the prefered embodiment of the invention, so that those skilled in the art may make and use the rim, I am aware that changes may be made in the details set forth without departing from the spirit of the invention as expressed in the claims.

What I claim and desire to secure by Letters Patent is:—

1. A tire rim comprising inner and outer ring-like sections arranged in telescopic relation and each having a cylindrical portion and an outwardly extending flange, notches provided in the cylindrical portion of the inner section, a plurality of recesses in the inner section merging into each of said notches, inwardly extending lugs fixed to the cylindrical portion of the outer section and projecting into said notches, and movable locking members carried by the outer section and each provided with lugs which extend into the said recesses.

2. A tire rim comprising inner and outer ring-like sections arranged in telescopic relation and provided with cylindrical portions and outwardly extending annular flanges, notches arranged in the cylindrical portion of the inner section, oppositely disposed recesses in the cylindrical portion of the inner section and merging into each of said notches, lugs fixed to the cylindrical portion of the outer section and projecting into said notches, hinged leaves secured to the outer section and extending into the notches, oppositely disposed lugs on each leaf projecting into the pair of recesses associated with each notch, and resilient means for holding the leaves in locked position.

In testimony whereof I hereunto affix my signature.

THOMAS F. BOWLER.